J. R. MAGUIRE.
CAR FENDER.
APPLICATION FILED NOV. 4, 1910. RENEWED JULY 19, 1911.

1,018,123.

Patented Feb. 20, 1912.
2 SHEETS—SHEET 1.

J. R. MAGUIRE.
CAR FENDER.
APPLICATION FILED NOV. 4, 1910. RENEWED JULY 19, 1911.
1,018,123.
Patented Feb. 20, 1912.
2 SHEETS—SHEET 2.
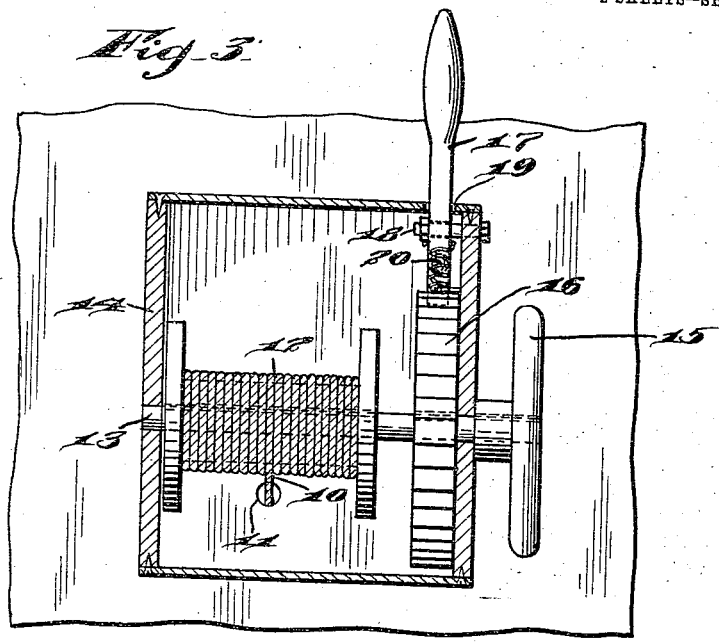
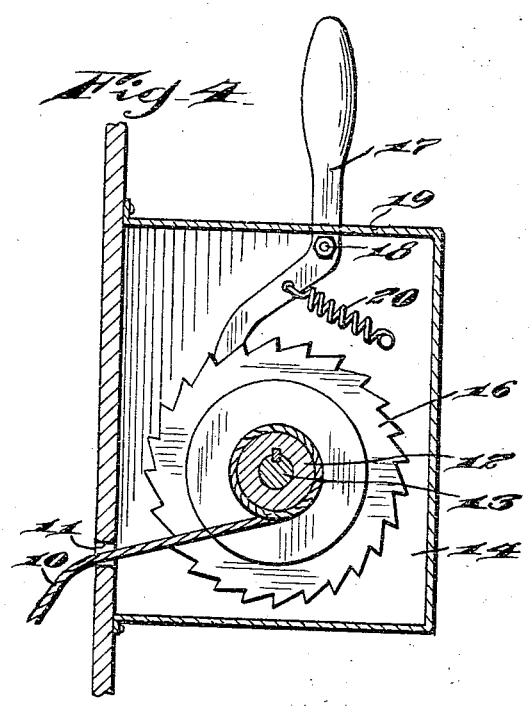
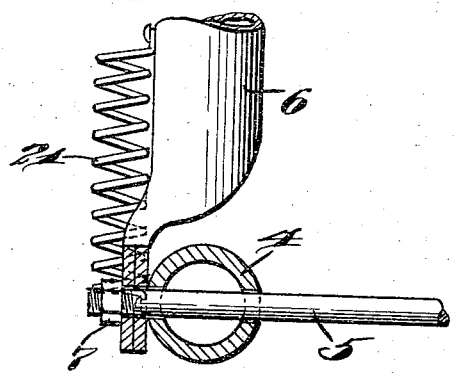
Witnesses
Inventor
John R. Maguire,
By Joshua R. H. Potts.
Attorney

UNITED STATES PATENT OFFICE.

JOHN RUSSELL MAGUIRE, OF PHILADELPHIA, PENNSYLVANIA.

CAR-FENDER.

1,018,123.  Specification of Letters Patent.  Patented Feb. 20, 1912.

Application filed November 4, 1910, Serial No. 590,623. Renewed July 19, 1911. Serial No. 639,472.

*To all whom it may concern:*

Be it known that I, JOHN RUSSELL MA-GUIRE, a citizen of the United States, residing at Philadelphia, in the county of Philadelphia and State of Pennsylvania, have invented certain new and useful Improvements in Car-Fenders, of which the following is a specification.

My invention relates to improvements in car fenders, the object of the invention being to provide a car fender which may be maintained at any desired elevation above the track, and which can be quickly released by the motorman and allowed to fall onto the track so as to render it impossible for a person or object to pass under the fender.

A further object is to provide improved means for elevating the fender and holding it at the desired elevation, and improved means for releasing the holding means to permit the fender to fall.

With these and other objects in view, the invention consists in certain novel features of construction and combinations and arrangements of parts, as will be more fully hereinafter described and pointed out in the claims.

Figure 1:
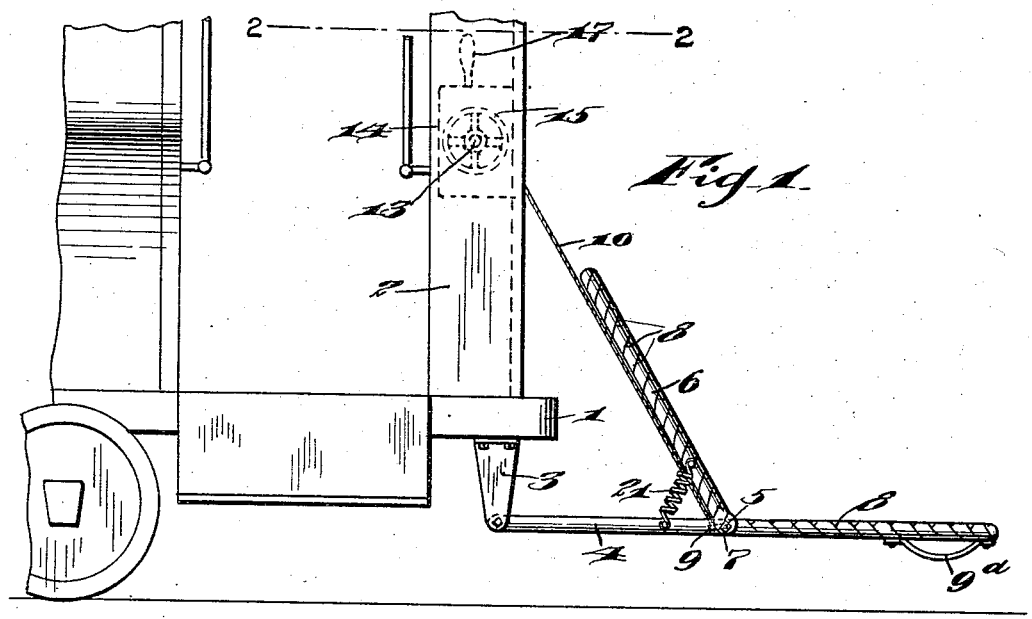
Figure 2:
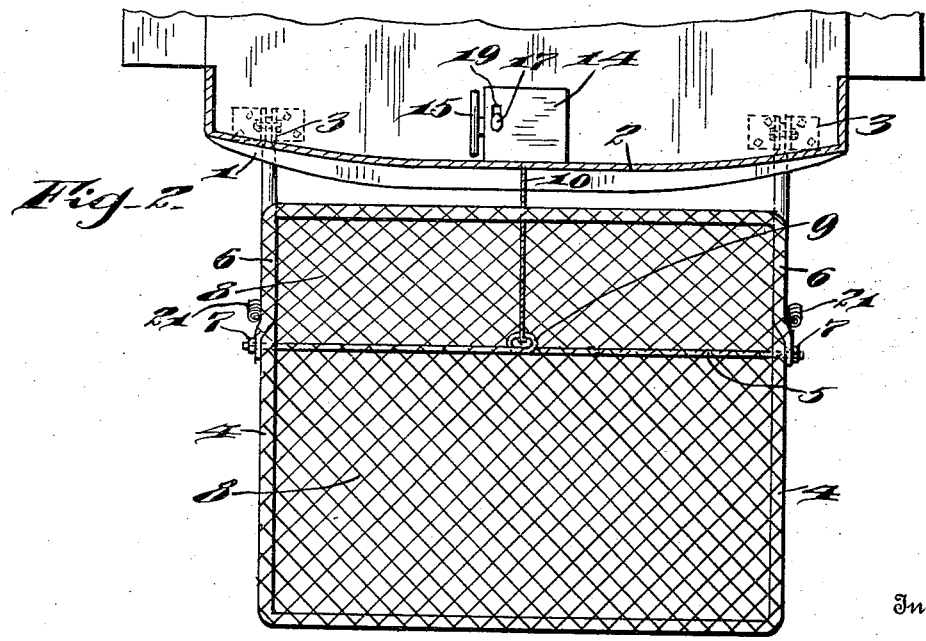

In the accompanying drawings: Figure 1, is a view in side elevation illustrating my improvements. Fig. 2, is a sectional plan view on the line 2—2 of Fig. 1. Fig. 3, is an enlarged view in sectional elevation, illustrating the fender holding and releasing means. Fig. 4, is a view in vertical section taken at right angles to Fig. 3, and Fig. 5, is an enlarged detail broken sectional view, illustrating the connection between the two parts of the fender.

1, represents the front platform of a car, and 2 the dash board. Brackets 3 are secured to the bottom of the car below the platform, extend downward therefrom, and to their lower ends the side bars 4 of my improved fender are pivotally connected. At a point between the ends of the side bars 4, they are connected by a transverse rod 5 which projects through the bars 4, and an inclined member 6 of the fender is pivotally supported on this rod 5 and is held in place by nuts 7 screwed onto the ends of the rod. The particular structure of the fender, between the side members is not material. I have shown a rope netting for the purpose. The fender members are pivotally connected and spring shoes 9ª are provided on the forward side portions of the fender to run on the track when the fender is lowered. Rod 5, midway its ends, is bent forming an eye 9, with which a rope, chain, or other flexible connecting device 10 is secured. The other end of this flexible connecting device 10 passes through an opening 11, in dash board 2, and is secured upon a reel 12. Reel 12 is fixed to turn with a shaft 13, and the latter is mounted in a boxing or casing 14, fixed to the inner face of the dash board 2. Shaft 13, at one end, projects outside of the boxing 14, and on this protruding end of the shaft a hand wheel 15 is secured, and the motorman operates this hand wheel to wind the flexible connecting device 10 on drum 12 and raise the forward end of the fender to the desired elevation.

A ratchet wheel 16 is fixed to shaft 13, within the boxing 14, and a lever pawl 17 is pivotally mounted within the boxing on a bolt 18 and projects upward through a slot 19 in the top of the boxing. A spring 20 holds this lever pawl in engagement with the teeth of ratchet wheel 16 to normally hold drum 12 against turning, permitting however, the ratchet wheel to ride beneath the same when winding the flexible connecting device 10 on the reel.

When the motorman approaches a person or object on the track, and he can not stop his car before reaching the person or object, he moves lever 17, which releases ratchet wheel 16 and permits the fender to fall into close contact with the track.

The member 6 of the fender is held in an inclined position by means of the flexible connecting device 10, and to prevent any possibility of the member 6 swinging forwardly and downwardly, light coiled springs 21 connect the member 6 with the bars 4, as illustrated most clearly in Figs. 1, and 5.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with a car, and brackets secured to the car and depending therefrom, of a fender pivotally connected at its rear end to said brackets, spring contact shoes on the lower face of the fender at its forward end, a reel supported on the car, a flexible connecting device between the reel and the fender, means for turning the reel to wind the connecting device thereon and elevate the fender, a ratchet wheel secured to turn with the reel, a pivoted spring held lever engaging the teeth of said ratchet wheel, a hinged member on the fender, and springs connecting said hinged member with the main portion of the fender and holding the hinged member in an inclined position against the flexible connecting device, substantially as described.

2. The combination with a car, a dash board thereon having an opening therein, and a fender pivotally connected to the car, of a boxing secured to the inner face of the dash board, a shaft mounted in said boxing, and projected at one end through the boxing, a hand wheel on the protruding end of the shaft, a reel fixed on the shaft, a flexible connecting device between the reel and the fender and passing through the opening in the dash board, a ratchet wheel on the shaft in the boxing, a lever projecting through the boxing and engaging the ratchet wheel, a hinged member on the fender, and springs connecting said hinged member with the main portion of the fender and holding the hinged member in an inclined position against the flexible connecting device, substantially as described.

In testimony whereof I have signed my name to this specification in the presence of two subscribing witnesses.

JOHN RUSSELL MAGUIRE.

Witnesses:
M. R. POTTS,
C. E. POTTS.

---

Copies of this patent may be obtained for five cents each, by addressing the "Commissioner of Patents, Washington, D. C."